United States Patent [19]
Kurpiela

[11] Patent Number: 5,579,979
[45] Date of Patent: Dec. 3, 1996

[54] SOLDERING/DESOLDERING NOZZLES FOR SMD'S

[75] Inventor: Gerhard Kurpiela, Brackenheim, Germany

[73] Assignee: Cooper Industries, Inc., Houston, Tex.

[21] Appl. No.: 213,763

[22] Filed: Mar. 16, 1994

[30] Foreign Application Priority Data

Mar. 29, 1993 [DE] Germany .............................. 9304784 U

[51] Int. Cl.$^6$ .............................. B23K 1/012; B23K 3/00
[52] U.S. Cl. .............................................. 228/6.2; 228/264
[58] Field of Search .............................. 228/51, 264, 6.2, 228/180.21, 213

[56] References Cited

U.S. PATENT DOCUMENTS

| | | | |
|---|---|---|---|
| 4,295,596 | 10/1981 | Doten et al. | 228/264 |
| 4,564,135 | 1/1986 | Barresi et al. | 228/6.2 |
| 4,787,548 | 11/1988 | Abbagnaro et al. | 228/264 |
| 4,828,162 | 5/1989 | Donner et al. | 228/6.2 |
| 5,139,193 | 8/1992 | Todd | 228/6.2 X |
| 5,222,649 | 6/1993 | Funari et al. | 228/6.2 |
| 5,309,545 | 5/1994 | Spigarelli et al. | 228/6.2 |
| 5,419,481 | 5/1995 | Lasto et al. | 228/264 X |

*Primary Examiner*—J. Elpel
*Attorney, Agent, or Firm*—Conley, Rose & Tayon, P.C.

[57] ABSTRACT

An apparatus for soldering/unsoldering SMD components comprising a heating nozzle which both permits direct heating of the component by contact with a hot nozzle bottom and directs a stream of hot gas onto the leads of the components. The nozzle bottom is preferably made of highly thermoconductive material and the hot gas stream is directed onto the leads by means of at least one outlet slot in the nozzle bottom adjacent the nozzle wall. The nozzle further comprises a centered suction means for positioning/removing the component.

8 Claims, 1 Drawing Sheet

SOLDERING/DESOLDERING NOZZLES FOR SMD'S

The present invention relates to a heating nozzle as part of a soldering/unsoldering apparatus, in particular for integrated circuits, and to a corresponding soldering/unsoldering apparatus.

A number of soldering/unsoldering apparatus, in particular for integrated circuits, are known that act either on strip conductors on the side of a printed board facing away from the integrated circuit, or directly on the terminals of integrated circuits to melt the solder used for connecting the integrated circuit so that the integrated circuit can be removed from the printed board. The heat necessary for heating the solder is applied either by direct thermal conduction, i.e. by contact with a heated die, or by means of hot air.

Heating by means of hot air is particularly suitable for soldering/unsoldering large SMD components since this permits all soldering joints to be heated, or parts being soldered in to be soldered, substantially at the same time. The nozzles used in the hot-air method are provided for the purpose of unsoldering partly with a suction pipe for lifting the unsoldered component off the printed board.

Prior art soldering/unsoldering apparatus have various disadvantages in particular with respect to the design of their heating nozzles. Thus, with conventional heating nozzles a stream of hot air passes onto the component over the total outlet cross-sectional area of the nozzle. Due to this undirected action of hot air it may be, if there is high heat dissipation through the printed board, e.g. at the connection to ground, that the amount of heat supplied to the solder through the component lead does not suffice to melt it. To eliminate this disadvantage one must supply relatively large amounts of heat to the component. This in turn causes great heating in the environment of the component to be unsoldered, which may adversely affect the functioning of adjacent components or their soldering joints.

The present invention is based on the problem of providing a soldering/unsoldering apparatus of the abovementioned type that is of simple construction and inexpensive to produce and permits fast and reliable soldering/unsoldering, in particular of integrated circuits.

This problem is solved by a soldering/unsoldering apparatus employing the heating nozzle of the present invention. This nozzle provides for application of heat to the top of the component, by conduction or thermal radiation, sufficient to melt solder in concert with the application of heat, by diffusion from the hot gas, directed onto the component leads which both permits direct heating of the component by contact with a hot nozzle bottom and ensures a stream of hot gas directed onto the leads of the components.

The inventive heating nozzle includes for this purpose a housing with an inlet port, an outlet port and a nozzle bottom which is preferably disposed in the area of the outlet port of the nozzle such that a stream of hot gas guided through the nozzle heats the nozzle bottom. The nozzle bottom is for this purpose made in particular of a highly thermoconducting material.

The nozzle bottom is advantageously dimensioned relative to the outlet port of the nozzle such that slotlike openings for discharging the hot gases are formed in the vicinity of the inner circumferential edge of the outlet port. Depending on the application the housing can have a rectangular, square, circular or other suitable form in the area of the outlet port of the nozzle. The inlet port of the nozzle advantageously includes a connecting piece with a slotlike centering guide. This design permits the nozzle to be taken up replaceably on a suitable nozzle support.

According to a further advantageous design the heating nozzle includes suction means whose connecting piece is preferably disposed concentrically within the nozzle connecting piece. The suction means extends from the connecting piece to the nozzle bottom, opening here into suction ports provided on the nozzle bottom. The cross section of these suction ports is advantageously greater than the cross section of the corresponding suction fitting. To adapt the suction port to the particular components to be unsoldered one can provide suction inserts therein. They are in particular of replaceable design and have a sleevelike form.

The inventive heating nozzle is finally part of a soldering/unsoldering apparatus. The latter includes in the conventional way a nozzle support in the form of a handle which is connected via a corresponding vacuum or hot-gas pipe with a control device. The control device serves in particular to control the temperature of the stream of hot gas and to switch and adjust the vacuum and stream of hot gas. The control, in particular the afflux of hot gas and the switching on and off of the vacuum, can advantageously be performed by a foot switch.

Altogether the inventive soldering/unsoldering apparatus permits faster and gentler soldering than conventional apparatus that were equipped solely with hot-gas nozzles or heated dies, since both the component and the component leads are heated (through the nozzle bottom and the hot gas, respectively). One thus requires altogether less hot gas for heating the soldering points to the melting point, which also spares the surrounding components. The proposed soldering/unsoldering apparatus also permits protection of the printed board since placing the plane nozzle bottom on the component always ensures a uniform distance from the board.

The inventive soldering/unsoldering apparatus shall now be explained in detail with reference to the enclosed drawings, in which.

Figure 1:
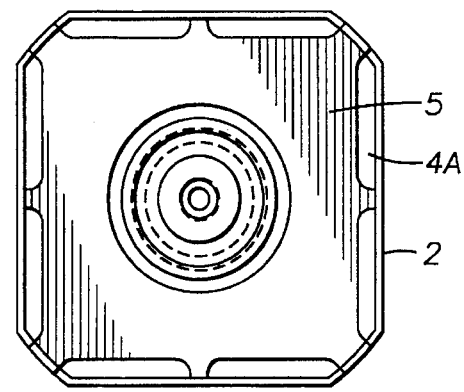
FIG. 1 shows a top view of the nozzle bottom of a heating nozzle.

FIG. 1 shows a top view of the contact surface of nozzle bottom 5 which is placed on component 15 to be soldered/unsoldered unsoldered during operation of the soldering/unsoldering apparatus. Between nozzle bottom 5 and nozzle housing 2 there are several slotlike recesses 4a which permit hot air 6 to pass in the direction of leads 16 of the component to be heated.

Figure 2:
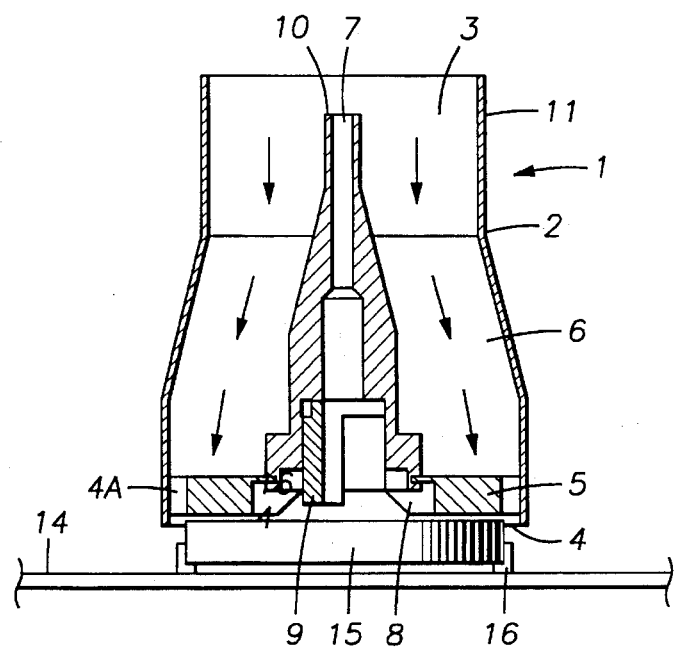
FIG. 2 shows a schematic cross-sectional view of an inventive heating nozzle placed on a component.

FIG. 2 shows a schematic cross-sectional view of the heating nozzle marked altogether as 1. One can see housing 2 which includes inlet port 3 and outlet port 4. In the embodiment example shown the cross section of outlet port 4 is greater than that of inlet port 3. Nozzle 1 also includes nozzle bottom 5 disposed in the area of the outlet port. Hot air 6 flows round and heats the nozzle bottom on its back and sides. It escapes through slotlike recesses 4a between the nozzle bottom and nozzle housing 2, passing specifically into the area of leads 16 of component 15.

Inventive heating nozzle 1 also includes suction means 7 connected with nozzle bottom 5 in the center in the embodiment example shown. Suction means 7 opens into suction port 8 in the nozzle bottom. To adapt suction port 8 to the particular application one can provide sleevelike replaceable suction inserts 9 therein.

For soldering/unsoldering, the inventive heating nozzle is placed with the contact surface of nozzle bottom 5 on the component either directly or with a small space therebetween. In the embodiment example shown a narrow space is left between nozzle bottom 5 and component 15. This is due to the fact that the suction insert of the suction means protrudes just beyond the level of nozzle bottom 5. In this case the component is heated, not by direct thermal conduction from the nozzle bottom to the component, but via the thermal radiation emitted by nozzle bottom 5. The heating of component 15 and the additional hot-air flow through slot-like openings 4a in the direction of leads 16 cause a fast and simultaneous heating of the soldering points.

Figure 3:
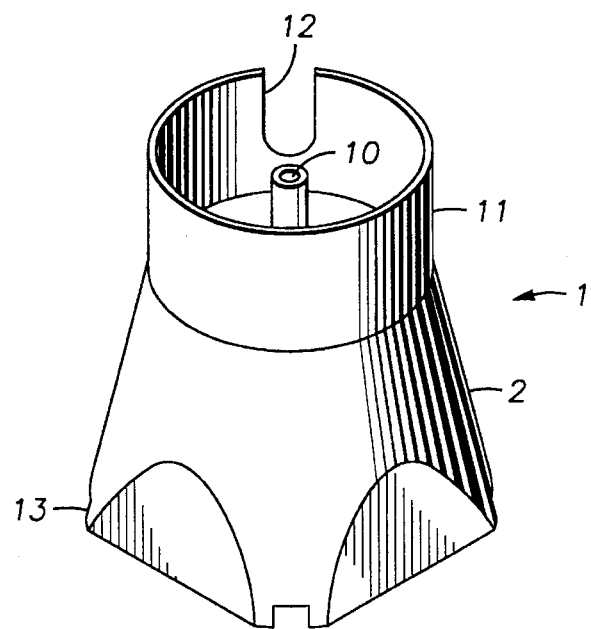
FIG. 3 shows a perspective view of the housing of the inventive heating nozzle.

FIG. 3 shows a perspective view of the design of heating nozzle 1. Housing 2 is in particular bell-shaped with four flat areas of the bell wall offset by 90° forming an altogether square outlet cross section of the housing. As clearly recognizable in FIG. 3, the housing also includes recesses 13 in the corner areas of the outlet cross section that in particular permit the hot air acting on the component to escape. To permit easy replacement of the inventive heating nozzle, it includes cylindrical connecting piece 11 in the area of inlet cross section 3 for slipping heating nozzle 1 onto a suitable nozzle support, which may be formed in particular as a handle. For this purpose slotlike centering guide 12 can additionally be provided, extending from the upper edge of connecting piece 11. Another connecting piece 10 is preferably also provided within connecting piece 11 for connecting suction means 7 with a corresponding vacuum pipe. In the embodiment example shown, connecting pieces 10 and 11 are disposed concentrically, which in particular facilitates slipping the nozzle onto the support.

The inventive heating nozzle is operated in particular in conjunction with an accordingly designed soldering/unsoldering apparatus which is not shown in detail here.

I claim:

1. A heating nozzle for soldering or unsoldering integrated circuits comprising:

a nozzle housing having an inlet port in fluid communication with an outlet port;

a heatable nozzle bottom disposed in the area of said outlet port and subjected to a stream of hot gas guided through the nozzle; and a centrally disposed suction means in communication with said nozzle bottom and having at least one suction port extending through the nozzle bottom, said suction port having at least one replaceable suction insert sleeve having an upper edge that protrudes just beyond said nozzle bottom, said nozzle heating a soldering joint by contact heat in addition to the hot gas of the nozzle.

2. A heating nozzle for soldering or unsoldering an integrated circuit comprising:

a nozzle housing having an inlet port in fluid communication with an outlet port and a heatable nozzle bottom disposed in the area of said outlet port and directly subjected to a stream of hot gas guided through the nozzle, whereby solder is melted by heat transferred from the nozzle bottom to the top of a component to be soldered or unsoldered, as well as by hot gas flowing onto the component's leads, said housing having a substantially rectangular outlet cross-section, the cross-sectional area of said inlet port being smaller than the cross-sectional area of said outlet port.

3. A heating nozzle for soldering or unsoldering an integrated circuit comprising:

a nozzle housing having a inlet port in fluid communication with an outlet port and a heatable nozzle bottom disposed in the area of said outlet port and directly subjected to a stream of hot gas guided through the nozzle, whereby solder is melted by heat transferred from the nozzle bottom to the top of a component to be soldered or unsoldered, as well as by hot gas flowing onto the component's leads; and a centrally disused suction means and a tubular connecting piece attached to the inlet port, said connecting piece comprising a centering slot extending from the upper edge of said connecting piece.

4. A heating nozzle for soldering or unsoldering an integrated circuit comprising:

a nozzle housing having an inlet port in fluid communication with an outlet port and a heatable nozzle bottom disposed in the area of said outlet port and directly subjected to a stream of hot gas guided through the nozzle, whereby solder is melted by heat transferred from the nozzle bottom to the top of a component to be soldered or unsoldered, as well as by hot gas flowing onto the component's leads, said nozzle bottom being made of a thermoconducting material.

5. A heating nozzle for soldering or unsoldering an integrated circuit comprising:

a nozzle housing having an inlet port in fluid communication with an outlet port;

a heatable nozzle bottom disposed in the area of said outlet port and directly subjected to a stream of hot gas guided through the nozzle, whereby solder is melted by heat transferred from the nozzle bottom to the top of a component to be soldered or unsoldered, as well as by hot gas flowing onto the component's leads; and a centrally disposed suction means in communication with said nozzle bottom, said suction means comprising at least one suction port extending through the nozzle bottom and a suction connector extending through said inlet port, said suction port being in communication with said suction connector and having a cross-section that tapers toward said suction connector.

6. The nozzle of claim 5 wherein said suction means is detachably connected to the nozzle bottom.

7. The nozzle of claim 5 wherein said suction port comprises at least one replaceable insert sleeve having a flared end protruding through said nozzle bottom such that said nozzle bottom directly contacts the top of a component to be soldered or unsoldered.

8. The nozzle of claim 5 wherein said suction port comprises at least one replaceable insert sleeve having a flared end protruding through and slightly beyond said nozzle bottom whereby said insert flared end contacts the top of a component to be soldered or unsoldered.

* * * * *